2,773,784

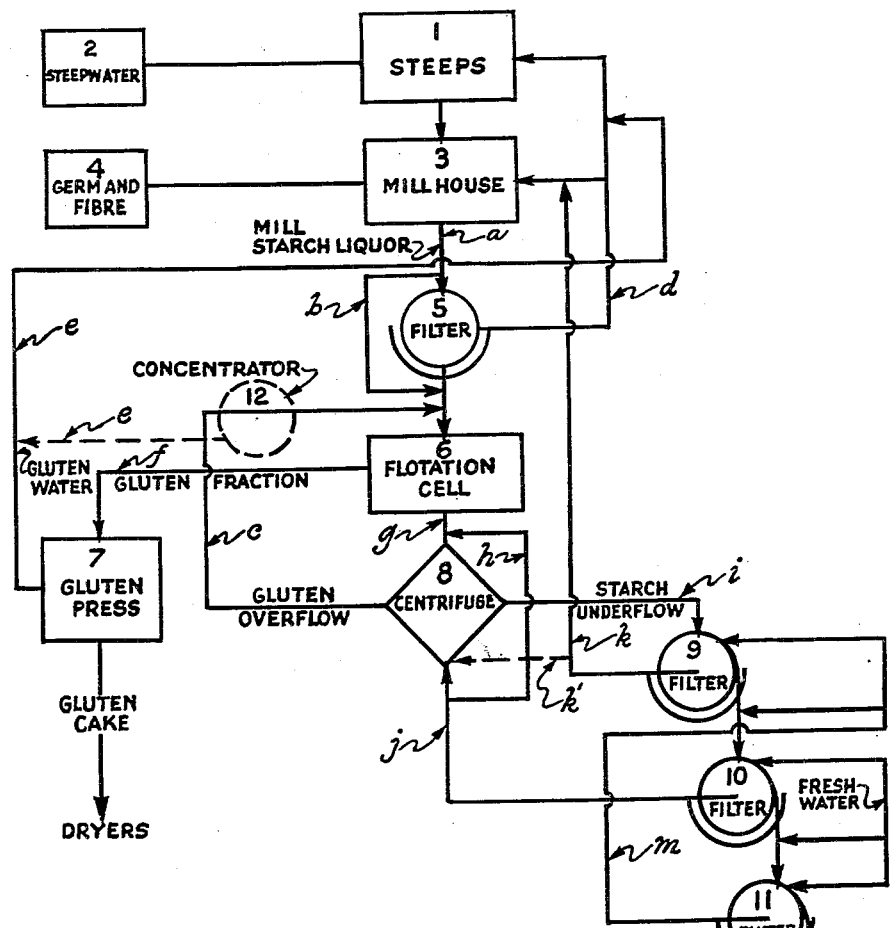
FIG. I
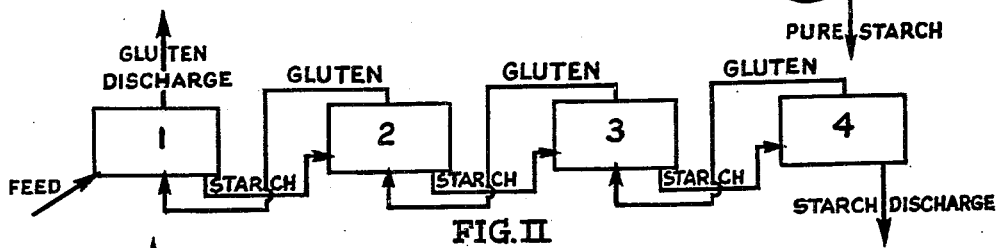
FIG. II
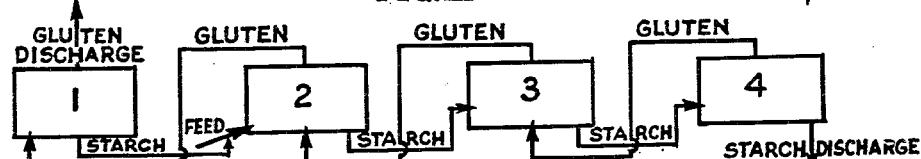
FIG. III

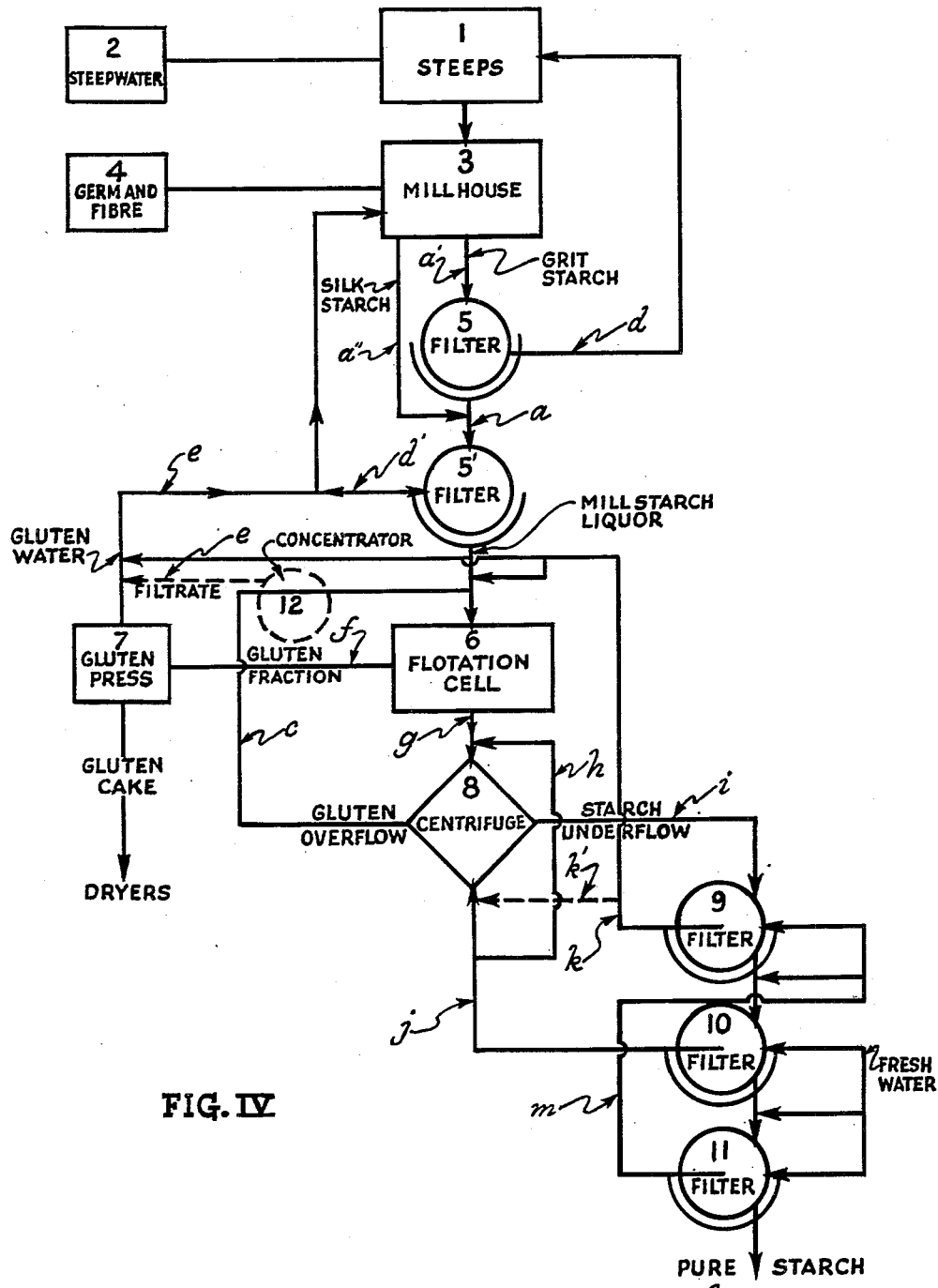
FIG. IV

STARCH MANUFACTURING PROCESS INVOLVING FLOTATION AND CENTRIFUGAL SEPARATION

Edgar H. Williams, Glen Ellyn, Ill., assignor to Corn Products Refining Company, New York, N. Y., a corporation of New Jersey Application April 4, 1952, Serial No. 280,548

2 Claims. (Cl. 127—68)

This invention relates to the separation of gluten from starch in mill starch liquors, particularly such liquors as are obtained by the wet milling of starch bearing materials, such as corn (maize) and milo grain, by the so-called "bottled-up" system.

An early method of separating gluten from starch in mill starch liquor obtained in the wet milling of corn involved the use of long, gently inclined troughs or "starch tables." In this "tabling" method the starch liquor is run over the tables during the course of which the starch settles by gravity and the gluten tails off at the ends of the tables. The table method is attended with a number of disadvantages, the most notable of which are the considerable amount of starch which tails off with the gluten resulting in loss of starch, and the great amount of factory space occupied by the tables and the great amount of maintenance required in their upkeep. Although the tabling method is still in use, it is being replaced by methods wherein separation is accomplished by means of continuous type centrifuges. When mill starch liquor is separated into its fractions e. g. by tables or by centrifuges, the separation is referred to as primary starch separation. The method using centrifugal separation obviates some of the disadvantages of former methods but, nevertheless, it also attended with disadvantages. For example, the gluten overflow, i. e. the fraction containing the gluten, discharge from the centrifuge is so dilute that it is not practical to dewater it in dewatering devices such as gluten presses unless it is first subjected to a preliminary dewatering treatment. Obviously, such additional treatment adds to the cost of obtaining the starch and gluten. Also, the starch underflow, i. e. the fraction containing the starch, usually contains sufficient protein so that a second or third treatment in the centrifuge is required to reduce the protein content to the desired level. Typical results obtained thus far with a centrifuge in a single pass show that the starch underflow will contain about 0.6 percent of insoluble protein and the gluten overflow about 50 percent of insoluble protein. The other 50 percent of material in the overflow is starch plus other solids leached from the grain during milling operations. By using a multiple pass system in counterflow arrangement, a starch underflow containing 0.4 percent of insoluble protein, dry basis, and a gluten overflow containing 65 percent of insoluble protein, dry basis, may be obtained. Another disadvantage of separating mill starch liquor into starch and gluten fractions with a centrifuge is that the mill starch liquor should preferably be treated at a gravity within a fairly narrow range. Furthermore, the gravity must be maintained at a specific level during the centrifuging operation in order to obtain uniform operation. Thus, the gravity should preferably not exceed about 12° Bé. for maximum separation.

A method has recently been proposed to obtain more complete removal of protein from starch in mill starch liquor wherein the mill starch is first given a preliminary separation treatment in centrifuges. The starch underflow which still contains some protein is first washed to reduce the solubles content therein and is then subjected to a specific flotation treatment to remove more of the protein. This method is described in U. S. Patent No. 2,525,430. While this method reduces somewhat the amount of protein in the starch underflow, it is limited in that the solubles content of the starch liquor being treated must not exceed a certain value.

It is an object of the present invention to provide a method of separating gluten from starch contained in mill starch liquors obtained from the wet milling of starch bearing materials whereby virtually complete separation of the gluten and starch is attained. It is a further object to provide a method whereby gluten concentrators may be omitted from the system, due to the fact that the gluten fraction separated from the starch fraction contains a high concentration of gluten. Still a further object is to provide a more economical method for separating the gluten and starch in mill starch liquor in that less power and maintenance will be required as compared to prior art methods. Other objects will appear hereinafter.

The first step in carrying out my invention comprises adjusting the gravity of mill starch liquor to a value within the range of about 12° Bé. to about 19° Bé. at 60° F. Thereafter such liquor is subjected to froth flotation whereby there is obtained a gluten rich fraction and a starch rich fraction. The fraction containing the starch is subjected to a further separation treatment, preferably in a centrifuge designed to separate, by centrifugal force, materials having different specific gravities to remove residual protein. The fraction containing the gluten may be dewatered as in gluten presses without further treatment. Process waters, i. e. waters separated from the starch and gluten fractions, thus obtained may be reused in the wet milling process.

I have found, contrary to the statements of previous investigators, that the principles of froth flotation may be applied to mill starch liquor for primary separation and further that it may be applied to such starch liquors without reducing the amount of soluble material present therein, e. g. it may be applied to mill starch liquor obtained in the so-called high solubles system of wet milling of grain.

The method employed in the froth flotation step is based on the same principles and is virtually the same as that used in the froth flotation of ores to effect separation of minerals from ores. The process is ordinarily operated as a continuous process although a batch process may also be used. The aeration of mill starch liquor produces bubbles which carry to the surface high protein content material, leaving the starch in the bottom of the cell from which it is discharged. Presumably, the small quantity of oil present in the mill starch liquor acts as a flotation agent. The effect of soluble material in the starch liquor undergoing treatment is not understood but apparently solubles have some effect on the flotation operation.

The flotation treatment may be carried out in a single cell or in a series cell arrangement in accordance with established principles in flotation separation. The treatment thereafter may be in any type of apparatus wherein separation of starch and gluten is effected by gravity or other means. Separation at this stage by centrifugal force is preferable.

The principles of my invention are applicable to the so-called high solubles "bottled-up" system and also the so-called low solubles "bottled-up" system, as well as combinations thereof, of wet milling of grains, such as corn (maize) and milo grain.

In the high solubles system the natural soluble materials in the grain which are leached out during milling operations and which are contained in the mill starch liquor are allowed to remain in the mill starch liquor subjected to primary starch separation. The water from the gluten dewatering operation is used for steeping and ordinarily this is the only source of water for steeping. In the low soluble system the solubles content of the mill starch liquor is reduced from about 500 to 900 grains per gallon of water in the starch liquor, usually contained in mill starch liquors from corn or milo grain, to about 300 grains per gallon. This is accomplished by replacing a part of the water in the so-called silk starch and also in starch liquor from the main starch stream usually referred to as grit starch, by concentration followed by reslurrying with water from the filters used in the final washing and purification of the starch. In this system the water from gluten dewatering operations is not sent directly to the steeps. It is sent to the mill house for use there. Filtrate water derived from the concentrators is used for steeping. Various combinations of the high and low solubles systems are possible. Thus, in one embodiment of a partial low solubles system, grit starch is partially dewatered and the cake reslurried in silk starch liquor.

As already mentioned, the gravity of the mill starch liquor to be treated in the flotation cell should be within the range of about 12° Bé. to 19° Bé. at 60° F. Better results, as far as the quality of the separated starch is concerned, are obtained when the feed to the flotation apparatus is at the higher end of this range. The residual protein content of the starch is lowered with increased feed gravity.

The solubles content of the feed to the flotation cell may vary over a wide range. Mill starch liquors from the high solubles system usually contain about 700 grains of soluble material per gallon of water in the liquor, and occasionally will be as high as 900 grains per gallon. The solubles content of mill starch liquor from the low solubles system as currently practiced is on the average about 300 grains per gallon of water in the liquor but may be lower or higher depending upon the system. The solubles content of the mill starch liquor does not appear to be critical, however, better separation of gluten and starch is obtained if the solubles content is not below about 200 grains per gallon. The values hereinabove given are applicable to both corn (maize) and milo grain. In primary separation of mill starch liquor with a flotation cell better separation is attained when the solubles content is within the range of 300 to 400 grains per gallon than at lower values.

The practical embodiments of my invention, as illustrated in the flow sheet drawings hereto attached, will now be described. The invention is not to be regarded, however, as limited to these embodiments. The principles of my invention may be applied to any system of wet milling wherein mill starch liquors of the character described are obtained. In the description values in parentheses indicate ranges permissible in carrying out the invention. Dotted lines indicate alternative processes.

Figure I shows my invention as applied to one embodiment of the high solubles system of wet milling. In the flow-sheet drawing the numeral 1 represents the usual multiple unit steeping system and 2 the steepwater. Corn or milo grain is steeped at 1 and sent to the mill house represented by the numeral 3 wherein the grain is ground, the germs separated by gravity, the fibre removed from the degerminated grain, whereby there is obtained an aqueous slurry of finely divided particles of starch and gluten referred to as mill starch or mill starch liquor. This slurry also contains most of the residual soluble materials not removed by the steeping operation. Numeral 4 represents the germ and fibre separated from the grain undergoing milling. The mill starch liquor from 3 (represented by the line designated a) is partially dewatered by a filter 5 and then the gravity is adjusted to 18° Bé. (12–19° Bé.) at 60° F. by by-passing a portion of the liquor, shown by line b, and also adding the gluten overflow (line c) derived from centrifuge 8 as will be explained hereinafter. The solubles content of this starch liquor will be about 700 grains (500 to 900) per gallon of water in the liquor. The filtrate water (line d) from 5 is divided between 1 and 3, the bulk of the water being used in 3. After the gravity of the mill starch has been adjusted, the mill starch is introduced into a flotation apparatus 6. Optionally, but preferably, the temperature of the liquor is increased to 120° to 125° F. (the normal temperature of the liquor at this stage, being 100° F.) before introduction into the flotation apparatus to facilitate separation of starch and gluten. The flotation apparatus may consist of one cell or multiple cells. Figures II and III show two embodiments of a multiple cell unit and the flow of the liquor being treated. In Figures II and III, the numerals 1, 2, 3 and 4 each represent a flotation cell. In Figure II, the mill starch liquor is fed into cell 1. The gluten fraction is discharged from this cell. The starch fraction from 1 is fed into the bottom of cell 2, the starch fraction from 2 is fed into the bottom of cell 3, the starch fraction from 3 is fed into the bottom of cell 4 and the starch discharged from 4. The gluten fraction from each cell is withdrawn from the top of the cell and fed into the bottom of the previous cell in the series. In Figure III, the starch liquor is fed into cell 2 and the starch fraction goes forward as in Figure II. The starch fraction from cell 1 is added to the feed to cell 2. The flow of the gluten fraction is the same as in Figure II. Various other flow arrangements in accordance with the principles of froth flotation may also be used.

The fraction containing the gluten is dewatered as in gluten presses 7 and the gluten cake is then dried. The water from the presses (line e) is mixed with part of the filtrate from 5 and is used for steeping. The amount of insoluble protein in the gluten fraction (line f) discharged from the flotation apparatus will be about 70 percent (60 to 85 percent), dry basis, and the concentration will be about 13 oz. per gallon (10 to 16). The remainder of the material is starch and other solids derived from the wet milling of the grain in question.

The gravity of the starch fraction discharged from 6 (line g) is about 19° Bé. (13° to 21° Bé.) at 60° F. It contains 1 to 2 percent of insoluble protein, dry basis. The gravity of this fraction is adjusted to 11° Bé. (10° to 12 Bé.) at 60° F. with water, such as, for example, that obtained from the second starch washing filter 10 (line h), or from the first filter (line k). The diluted starch liquor is then introduced into centrifuge 8 (a centrifuge designed to separate materials of different specific gravities by centrifugal force) wherein further separation of gluten from the starch is effected. The starch underflow (line i) may be passed through another centrifuge in accordance with the established procedure. The insoluble protein content of the starch underflow will be about 0.3 percent (0.2 to 0.4 percent), dry basis.

The starch underflow is dewatered and washed as by a continuous vacuum type filter 9 (the filtrate k being used in 3), reslurried and filtered at 10, and optionally this procedure is repeated at 11. Part of the filtrate from 10 (line j) may be used as wash water in centrifuge 8 to displace solubles from the starch into the gluten overflow. Fresh water is introduced into the system at 10 and 11 for washing purposes.

The gluten overflow (line c) from 8 is used in adjusting the gravity of the mill starch liquor entering 6. Optionally, the gluten overflow is first concentrated in concentrator 12 before being added to the mill starch. The filtrate from the concentrator 12 (line l) is added to the gluten water (line e).

If washing is not desired during the centrifugal operation, water having the same solubles content as that of the feed to the centrifuge may be used for flushing operations. Thus there may be used for this purpose part of the filtrate water from 9 (line $k$), but without the use of wash water (line $m$) from the washing filter 11, or with so little wash that the water remains in the filter cake.

Inasmuch as the gluten fraction (line $f$) from 6 obtained in accordance with the principles of my invention is more highly concentrated than the gluten fraction of prior art process there will not be the same amount of gluten water as heretofore available for steeping. This will require readjustment of the water balance in the system but this readjustment can readily be carried out by those skilled in the art on the basis of the information disclosed herein and in accordance with the principles of the bottled-up system of wet milling. Thus, as already described above, some water from 5 may be used to supply the necessary volume of water required for steeping. Similarly, water used in the final purification of the starch may be reused in accordance with the countercurrent principles employed in wet milling, in various other ways than shown in Figure I. Obviously, not all possible variations of the reuse of process waters derived from the gluten and starch fractions hereinabove described can be set forth here.

Figure IV illustrates my invention as applied to one embodiment of the low solubles system of the wet milling of corn or milo grain. In the drawing the numeral 1 represents the usual multiple unit steeping system and 2 the steepwater. The corn or milo grain is steeped at 1 and sent to the mill house represented by the numeral 3 wherein the grain is ground, the germs separated by gravity, the fibre removed from the degerminated grain, whereby two streams of starch liquors are obtained, one referred to as grit starch (line $a'$) and the other as silk starch (line $a''$). When these are combined they form what is generally referred to as mill starch or mill liquor (line $a$). Numeral 4 represents the germ and fibre separated from the grain undergoing milling. The grit starch $a'$ which represents the portion of starch liquor obtained from the main milling stream is dewatered, as by filter 5. The filtrate (line $d$) is sent to the steeps. Silk starch $a''$ i. e., the portion of starch liquor obtained from the fibre system is used to repulp the filter cake from 5. The resultant liquor is dewatered in filter 5'. The filtrate $d'$ is sent to the mill house 3. The cake from 5' is repulped with gluten overflow C obtained from centrifuge 8 and part of the filtrate (line $k$) from a dewatering filter 9. The dewatering and repulping adjust the gravity of the mill starch liquor to the proper value for separation in the flotation apparatus 6. The gravity of the liquor entering the flotation call is preferably 18° Bé. but may be within the range of 12° to 19° Bé. at 60 F. Optionally, but preferably, the temperature of the liquor is increased to 120° F. to 125° F. to facilitate separation of starch and gluten. The flotation apparatus may be operated in accordance with the flows designated in Figures II and III or otherwise.

The fraction containing the gluten $f$ is dewatered as in gluten presses 7 and the gluten cake is then dried. The water from the presses $e$ is added to the filtrate $d'$ and the combination used in mill house 3.

The amount of insoluble protein in the gluten fraction discharged from the flotation apparatus will be about 70 percent (60 to 85 percent), dry basis, and the concentration will be about 13 oz. per gallon (10 to 16).

The starch fraction $g$ obtained from 6 will contain about 1 to 2 percent of insoluble protein, dry basis. The gravity of this fraction is adjusted to 11° Bé. (10 to 12) at 60° F. with part of the water $h$ obtained, for example, from second washing filter 10. The diluted starch liquor is introduced into centrifuge 8 for further separation of gluten from starch. Filtrate water $j$ from 10 may be used as wash water in the centrifuge 8. The starch underflow $i$ may be passed through another centrifuge in accordance with established procedure to effect further separation of gluten from starch. The insoluble protein content of the starch underflow will be about 0.3 percent (0.2 to 0.4), dry bath.

The starch underflow $i$ is dewatered as by a filter at 9, reslurried and filtered at 10, and optionally this procedure is repeated at 11.

The gluten overflow $c$ from 8 is used in adjusting the gravity of the mill starch liquor entering 6. Optionally, the gluten overflow is first concentrated in concentrator 12 before being added to the mill starch. The filtrate from the concentrator 12 (line $l$) is added to the gluten water (line $e$).

If washing is not desired during the centrifugal operation, water having the same solubles content as that of the feed to the centrifuge may be used for flushing operations. For example, there may be used for this purpose part of the filtrate water from 9 ($k'$) but without the use of wash water $m$ from filter 11, or with so little wash that the water remains in the filter cake.

The adjustment in the water balance required by reason of the fact that the process of my invention produces less gluten water than is usually available in the low solubles system can be made readily by those skilled in the art on the basis of the information herein set forth and in accordance with the principles of the bottled-up system of wet milling. Thus, as shown in Figure IV, water from 9 and 5' may be combined with gluten water $e$ and used in the mill house 3.

It will be apparent from the flow sheet drawings and description hereinabove presented that there are a number of advantages to be derived from using the process of my invention. The use of a flotation cell for primary separation makes it possible to obtain a gluten fraction which contains more protein and at a higher concentration of gluten than heretofore obtained. Thus, the gluten concentrators ordinarily employed may be eliminated. Further, the capacity of froth flotation apparatus per a given size installation is greater than that of a centrifuge. The flotation cells require less power and less maintenance than do centrifuges. The operating conditions for a flotation cell are less critical than for a centrifuge. Thus better separation of gluten from starch is accomplished in a simpler manner and at a lower cost than heretofore possible.

I claim:

1. In the process of obtaining starch from grain wherein the grain is steeped, comminuted and subjected in water to germ and fibre separating operations yielding mill starch liquor containing starch, gluten and solubles; treating mill starch to yield a gluten rich fraction and a starch rich fraction; the improvement which comprises adjusting the gravity of the mill starch liquor to about 12° Bé. to about 19° Bé. at 60° F. subjecting the liquor to froth flotation to obtain a gluten rich fraction and a starch rich fraction; and thereafter adjusting the gravity of the starch fraction to about 10° Bé. to about 12° Bé. at 60° F. and subjecting the starch fraction to continuous centrifugal separation to separately remove gluten in an overflow and starch in underflow, supplying to the centrifuge for flushing operations water having the same solubles content as the starch fraction entering the centrifuge, and using process waters derived from the overflow and underflow for steeping and subsequent milling operations.

2. In the process of obtaining starch from grain wherein the grain is steeped, comminuted and subjected in water to germ and fibre separating operations yielding mill starch liquor containing starch, gluten and solubles; treating mill starch to yield a gluten rich fraction and a starch rich fraction; the improvement which comprises adjusting the gravity of the mill starch liquor to about 12° Bé. to about 19° Bé. at 60° F. subjecting the liquor to froth flotation to obtain a gluten rich fraction and a starch rich fraction; and thereafter adjusting the gravity of the starch fraction to about 10° Bé. to about 12° Bé. at 60° F. and subjecting the starch fraction to continuous centrifugal separation to separately remove gluten in an overflow and starch in underflow, supplying to the centrifuge for flushing operations water having the same solubles content as the starch fraction entering the centrifuge and using the process waters derived from the gluten fraction obtained by froth flotation, from the gluten overflow and from the starch underflow in steeping and subsequent milling operations.

References Cited in the file of this patent

UNITED STATES PATENTS

| | | |
|---|---|---|
| 1,221,990 | Holden | Apr. 10, 1917 |
| 2,013,668 | Peltzer | Sept. 10, 1935 |
| 2,039,605 | Peltzer | May 5, 1936 |
| 2,097,531 | Peltzer | Nov. 2, 1937 |
| 2,124,284 | Boie | July 19, 1938 |
| 2,138,274 | Greenfield | Nov. 28, 1938 |
| 2,141,562 | Shurback | Dec. 27, 1938 |
| 2,186,037 | Peltzer | Jan. 9, 1940 |
| 2,251,448 | Giesecke | Aug. 5, 1941 |
| 2,316,807 | Peltzer | Apr. 20, 1943 |
| 2,323,077 | Peltzer | June 29, 1943 |
| 2,525,430 | Smith | Oct. 10, 1950 |
| 2,536,430 | Eckers | Jan. 2, 1951 |
| 2,543,281 | Ferrin | Feb. 27, 1951 |